US012755870B2

(12) United States Patent
Peixoto Filho et al.

(10) Patent No.: US 12,755,870 B2
(45) Date of Patent: Oct. 6, 2026

(54) FLAMMABLE CABLE AND CONTROL LINE ENCAPSULATOR

(71) Applicant: PETRÓLEO BRASILEIRO S.A.—PETROBRAS, Rio de Janeiro (BR)

(72) Inventors: Flavio Tito Peixoto Filho, Rio de Janeiro (BR); Antonio Francklin Martins Oliveira Junior, Macaé (BR); Marcelo Victor Tomaz De Matos, Aracaju (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 165 days.

(21) Appl. No.: 18/918,287

(22) Filed: Oct. 17, 2024

(65) Prior Publication Data

US 2025/0364160 A1 Nov. 27, 2025

(30) Foreign Application Priority Data

May 22, 2024 (BR) .......................... 1020240101499

(51) Int. Cl.
*H01B 13/14* (2006.01)
*H01B 3/44* (2006.01)

(52) U.S. Cl.
CPC ............. *H01B 13/14* (2013.01); *H01B 3/445* (2013.01)

(58) Field of Classification Search
CPC ........................................................ H01B 3/14
See application file for complete search history.

(56) References Cited

U.S. PATENT DOCUMENTS

| | | | | |
|---|---|---|---|---|
| 11,822,139 | B2 * | 11/2023 | Blazer | G02B 6/4432 |
| 2001/0050111 | A1 | 12/2001 | Neuroth et al. | |
| 2014/0352952 | A1 * | 12/2014 | Varkey | H02G 1/10 166/308.1 |
| 2016/0047210 | A1 * | 2/2016 | Pinkston | E21B 43/128 166/66.4 |
| 2016/0274323 | A1 * | 9/2016 | Chawda | G02B 6/44384 |

OTHER PUBLICATIONS

Craddock, G. & Wood, Stuart & Holley, Eric. (2019). Survival of an Optical Fiber Flatpack Due to Perforation. 10.2118/195868-MS.
Prysmian Group, Control Lines & Flatpacks, https://www.prysmian.com/sites/default/files/atoms/files/Flatpacks.pdf.
Scott et al., New Technique to Plug and Abandon Intelligent Well Completions with Flat Packs, Offshore Technology Conference Brasil, Oct. 2023.

* cited by examiner

*Primary Examiner* — Hung V Ngo
(74) *Attorney, Agent, or Firm* — Womble Bond Dickinson (US) LLP

(57) ABSTRACT

The present disclosure provides embodiments related to a flammable cable and control line encapsulator or flammable flatpack (thermally destructible) that maintains the characteristics of a conventional flatpack, commonly used in well completion operations, containing cables and lines, but with the property of combusting when ignited and reaching temperatures higher than 600-800° C. With the flammable cable and control line encapsulator of this disclosure, the melting of the column at a single point allows the propagation of the destruction of this component over a sufficient section for the formation of a permanent abandonment barrier, thereby enabling a faster abandonment process without the need to remove the production column.

21 Claims, 3 Drawing Sheets

FLAMMABLE CABLE AND CONTROL LINE ENCAPSULATOR

FIELD OF THE DISCLOSURE

The present disclosure falls within the technical field of oil and gas, specifically related to the drilling and completion of wells, and refers to a flammable, or thermally destructible, cable and control line (flatpack) encapsulator, which are devices commonly used to hold and wrap cables and wires in operations that occur in oil wells.

BACKGROUND OF THE DISCLOSURE

In well abandonment, especially in wells with wet completion, the goal is, whenever possible, to achieve well isolation through "through tubing" intervention, as it does not require the removal of the production column, making the operation much faster and less costly.

However, the presence of cables and lines (confined in flatpacks) in the well annulus, in the region where the abandonment plug will be positioned, prevents this type of operation, since such accessories could compose a leakage path through the cement plug, or any other material intended to compose the permanent abandonment barrier.

As most offshore wells contain such annular fittings along the upper completion, the through-tubing abandonment ends up having an extremely reduced application scenario.

To be viable, such accessories need to be removed or destroyed along a minimum section of 60 meters (or two sections of 30 m). There are studies for melting the column along with the accessories, but melting 60 meters of column implies risks, due to the excess of debris generated or possible deleterious consequences of excessive heat to the external barriers to the coating (cement and capping rock).

In view of the above, in order to solve the limitations and technical problems described above, the present disclosure describes a flammable cable and control line encapsulator or flammable flatpack (thermally destructible), containing cables and lines, but with the property of combusting when ignited and reaching temperatures higher than 600-800° C.

A well equipped with the flammable cable and control line encapsulator of the present disclosure has its self-destruct process initiated through a localized and limited melting of the column. As the melting of the column is, in this case, restricted to a small extent, it allows to avoid more drastic consequences to the integrity of the barrier elements.

STATE OF THE ART

The Craddock et al (2023) paper, entitled "Survival of an Optical Fiber Flatpack Due to Perforation" is part of the general state of the art and is more focused on fiber optic flatpacks. In the paper, the flatpack containing optical fibers is simulated for survivability in the coating of a drill gun system. The overall results of the comparative simulation indicate optimal location and configuration of the flatpack and indicate several do's and don'ts of the system that can be field tested, including not using clamps instead of concrete coating, placing the pack approximately 90° from the shaped charge, and decentralizing the charges.

In turn, document US20010050111A1 describes a pipeline flatpack for well control cable. The control cables include fluid communication tubes and a layer of metal armature that surrounds each of the fluid communication tubes. In an embodiment described, there are three fluid communication tubes that are arranged in a parallel relationship and kept in contact with each other. The metal armature layer is in contact with the outer surface of each of the three tubes and is preferably formed by a spiral wound metal tape.

The document "Control Lines & Flatpacks" describes a kind of product catalog of an oil company (Prysmian Group), with different types of flatpacks. In the introduction, it is described that flatpacks are designed to simplify installation and reduce the number of installation spooler units required during well completion and are available in a wide variety of configurations with single-pass and double-pass encapsulation options for additional protection.

Finally, the Scott et al. document (2023), entitled "New Technique to Plug and Abandon Intelligent Well Completions with Flat Packs" which is also part of the general state of the art, describes a new technique for connecting and abandoning smart well completions with flatpacks. The scope of the article was to highlight the complexities that arise when attempting to close and abandon (P&A) smart well completions and that upper well completion must be recovered. To recover, the production pipeline and flatpack must be cut or cut completely, and a cutting tool is used, which has been inserted into the pipeline and placed in position to make the cutting of the tube and flatpack with control lines.

Thus, in light of these documents, it is evident that the present disclosure differs from the others in a fundamental technical aspect: only the cable and control line encapsulator proposed in the present disclosure can be thermally destructible or self-igniting. These documents do not include such solution. Considering the above, it is also possible to perceive relevant differences in the solutions presented in the state of the art in relation to the present disclosure, and it is still possible to verify the presence of a differential technical effect in the present disclosure, considering the intrinsic advantages of the flammable cable and control line encapsulator.

Finally, none of the observed initiatives effectively aim to make well abandonment possible without the removal of the column. It is known that there have been attempts in this regard that aim to interrupt the continuity of such annular fittings through multiple perforations (explosive performations) in different directions, but then it was even observed that the dimensioning of the explosive intensity, in order to allow the full sectioning of the accessories without damaging the coating, can be challenging.

It is important to highlight that the present disclosure offers advantages considering the economic impact and productivity, which are associated with a simpler and faster abandonment process, without the need to remove the production column. Additionally, the cable and control line encapsulator presented here has a direct impact on health and safety issues, since the reduction in the time of use of vessels for abandonment implies a substantial reduction in $CO_2$ emissions.

BRIEF DESCRIPTION OF THE DISCLOSURE

The present disclosure refers to a flammable cable and control line encapsulator or flammable flatpack (thermally destructible) that maintains the characteristics of a conventional flatpack, commonly used in well completion operations, containing cables and lines, but with the property of combusting when ignited and reaching temperatures higher than 600-800° C. With the flammable cable and control line encapsulator of this disclosure, the melting of the column at a single point allows the propagation of the destruction of this component over a sufficient section for the formation of a permanent abandonment barrier, thereby enabling a faster abandonment process without the need to remove the production column. Additionally, a well equipped with the flammable cable and control line encapsulator would have its self-destruct process initiated through a localized and limited melting of the column. As the melting of the column is, in this case, restricted to a small extent, it allows to avoid more drastic consequences to the integrity of the barrier elements.

BRIEF DESCRIPTION OF THE FIGURES

To obtain a full and complete understanding of the object of this disclosure, the figures referenced below are presented.

DETAILED DESCRIPTION OF THE DISCLOSURE

The present disclosure refers to a flammable cable and control line encapsulator or flammable flatpack (thermally destructible), which is a completion component that maintains the characteristics of a common flatpack, containing cables and lines, but with the property of combusting when ignited and reaching temperatures higher than 600-800° C.

The design of the flammable cable and control line encapsulator is based on the idea that the melting of the column at a single point allows the propagation of the destruction of this component over a sufficient section for the formation of a permanent abandonment barrier, thereby enabling a faster abandonment process without the need to remove the production column.

This concept aligns with the Future Vision of Wells concerning the design of a self-abandoning oil well.

Figure 1:
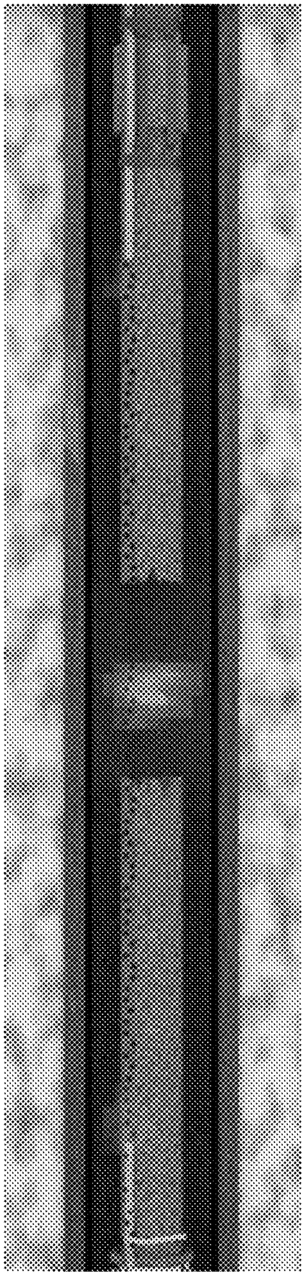
FIG. 1 shows a schematic illustration of the process in which a localized melt of the production column initiates the destruction of the TDF (thermally destructible flatpack) to a greater extent according to an embodiment of the disclosure.

As shown in FIG. 1, from the point of initial combustion, the cable and control line encapsulator would ignite, self-destructing along the entire length programmed for the placement of the cement plug. It is not necessary to use this type of cable and control line encapsulator along the entire length of the well, only 150 to 200 meters above the production packer, in front of the capping rock and in a section that is proven to be well cemented.

For the design of an alternative component, in this case the flammable cable and control line encapsulator, which would help enable through-tubing abandonment in wells with components in the annulus, the following premises were established.

That the flammable cable and control line encapsulator should have functionalities and parameters compatible with a standard flatpack, without compromising its applicability and meeting the usual demands of subsea wells for this type of equipment. This means fulfilling its function of transmitting pressure, fluids, or signals, with its installation being perfectly feasible.

That the flammable cable and control line encapsulator should maintain its functionality even when exposed to the well environment for decades. More specifically, when exposed to completion fluid and its additives, as well as possible hydrocarbon contamination.

That the flammability of the flammable cable and control line encapsulator should not be susceptible to be accidentally caused during transportation, handling, or even during the productive life of the well. Thus, it should require the application of a reasonably high level of energy to initiate its combustion.

Despite the previous requirement, the activation energy needed should not be so high as to pose a significant risk that the heat from a thermite applied inside the production column might not be sufficient to initiate its self-destruction process, in case the tubular melting is not complete and/or debris from this process prevents the effective transmission of heat to the annular space.

That it should be an economically viable cable and control line encapsulator, constructed with readily available materials and, if possible, without the need for complex manufacturing processes.

That it should be a compact cable and control line encapsulator, minimized as much as possible, considering the risk of incomplete combustion of the encapsulator, even in the event that it has been partially damaged during the deployment of the production column.

In other words, the cable and control line encapsulator should not have a matrix larger than necessary to minimize the material to be destroyed, which will depend on the design characteristics of each well, as wells have different column and coating diameters and may be directional or vertical.

Additionally, its exothermic reaction should generate enough heat for its self-destruction.

That its exothermic reaction does not generate enough heat to compromise the well integrity. That its self-destruction should generate only non-cohesive, discontinuous residues, which naturally settle to the wellbore bottom by gravity or can be easily removed by the displacement of fluid or cement slurry.

For the development of the flammable cable and control line encapsulator of the present disclosure, starting from the architecture of a common flatpack and with the aim of meeting the aforementioned premises, two key aspects were addressed.

The first of them related to the incorporation of combustible material so that, from an initial energy application, the cable and control line encapsulator would combust, continuously self-destructing up to its interface with the standard cable and control line encapsulator.

And the second aspect related to the selection of components of the cable and control line encapsulator, opting for those with a lower melting point and/or greater flammability, when applicable.

Figure 2:
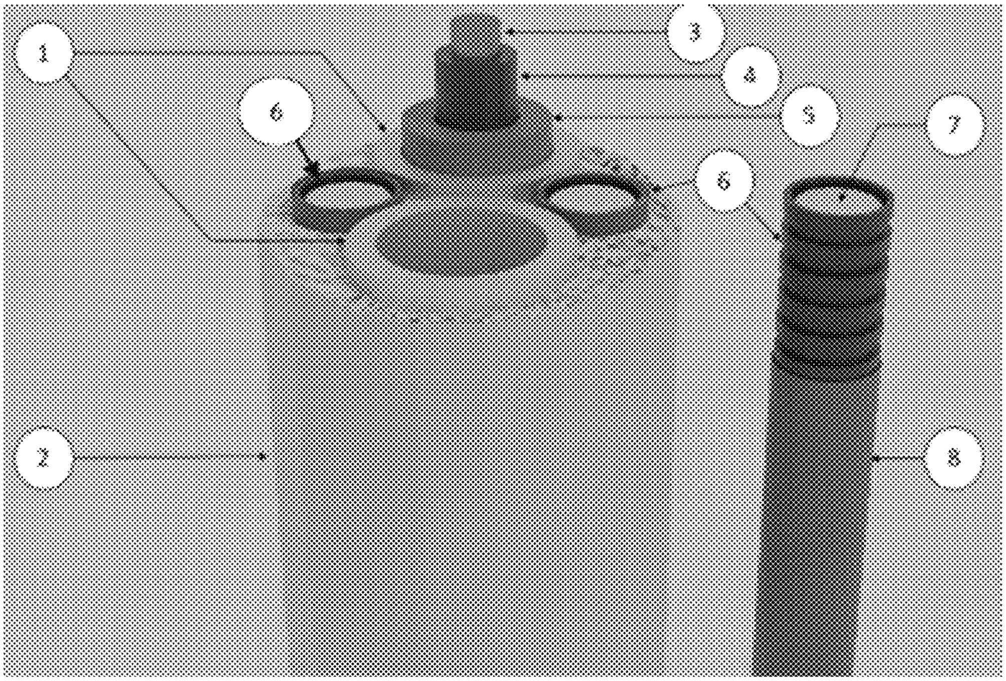
FIG. 2 shows schematically an isometric view of the flammable cable and control line encapsulator with emphasis on each of its main components, according to according to an embodiment of the disclosure.

In the example shown in FIG. 2, the flammable cable and control line encapsulator comprises at least one control line and one electrical cable encapsulator line (1), which can be manufactured preferably by Super Duplex steel (SDSS) or Inconel 825 steel. It should be noted that the number of control lines and/or electrical cable may vary depending on the needs of each well.

It additionally comprises a matrix (2), which can preferably be manufactured with santoprene or polypropylene, and be internally aerated, but with a smooth external finish to avoid chemical attack.

An electrical cable core (3), made of conductive material, preferably copper. An electrical cable coating A (4), which can be made of fluorinated ethylene propylene (FEP). An electrical cable coating B (5), which can be made of polypropylene (PP).

The cable and control line encapsulator also comprises at least two corrugated conduits (6), which can preferably be manufactured from high-density polyethylene (HDPE). A pyrotechnic material (7), which can typically be manganese oxide and aluminum thermite. And a conduit casing (8), which can be manufactured in polyvinyl chloride (PVC). Such conduits hold the pyrotechnic material, and their redundancy is necessary to minimize the risk of an interruption of the spread of combustion.

Regarding the pyrotechnic material, it should be noted that three options were analyzed: thermite based on iron and aluminum oxides; thermite based on manganese and aluminum oxides; and nitrocellulose. Nitrocellulose was promptly discarded when the risk of explosion due to impact during transport or handling was verified.

As for thermite composition options, thermite based on iron and aluminum oxides is the most common and easily obtained, in addition to being of lower cost. However, the energy required to start its combustion is greater (greater than 2000° C.) and, once started, the energy generated is also greater.

In search of a solution, thermite based on manganese and aluminum oxides (in some cases also molybdenum) was found, which, depending on its formula (proportion and granulometry), can produce a compound capable of igniting at around 600° C. with a reduced enthalpy and exothermic potential compared to the first option.

Although FIG. 2 illustrates a configuration with an electrical cable, a control line, and two thermite conduits, other configurations are possible. However, a significant increase in components can increase the rigidity of the cable and, moreover, require a higher thermal power of the compound in order to allow the melting of all the components.

This increase in heat generated should be assessed so as not to jeopardize the integrity of the other components of the well, particularly the cement sheath.

Conduits with thermite or corrugated conduits (6) are not continuous, being profiled in sections of two or three feet each. This design facilitates construction and prevents any localized damage to the cable and control line encapsulator from preventing it from achieving its purpose.

Figure 3:
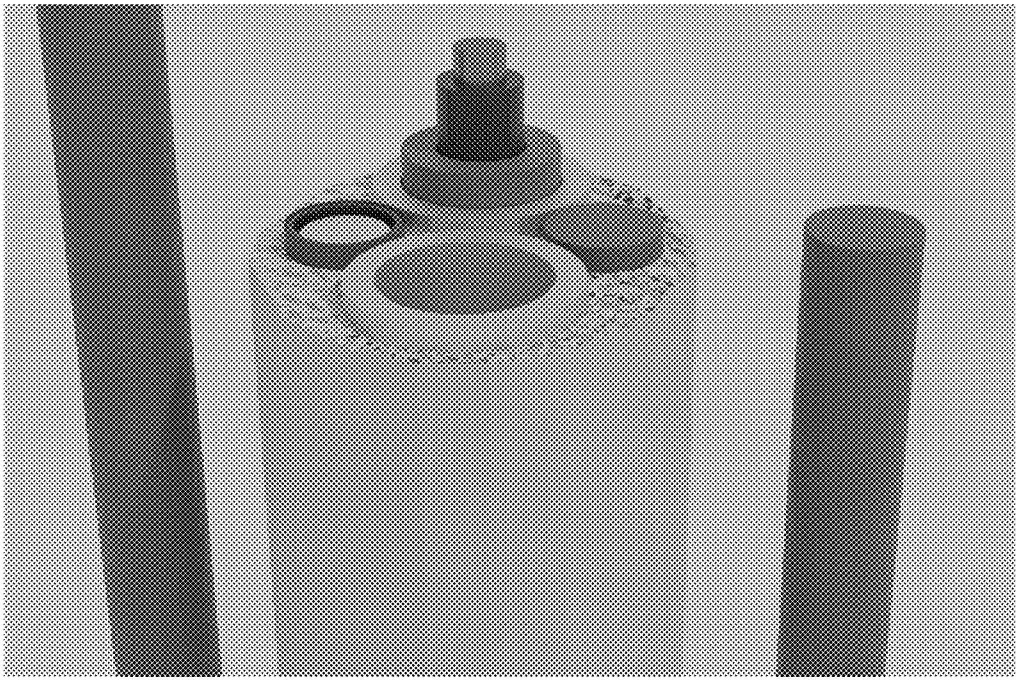
FIG. 3 shows an isometric view of the flammable cable and control line encapsulator with a section of the conduit with its casing according to an embodiment of the disclosure.

Each section is fully enclosed at its top and base by the casing, as shown in FIG. 3. This encapsulation prevents any damage to the cable and control line encapsulator that exposes the thermite from causing the complete degradation of the entire system over time, and also limits the loss of thermite through any openings.

The interruptions in each conduit are positioned out of phase (FIG. 3). The reason for this is to prevent the interruption from stopping the propagation of combustion. If this occurs in the conduit where the interruption occurs, the other conduit(s), being intact, are responsible for propagating the burn and restarting the combustion of the first one after the interruption.

The conduits are corrugated to increase the flexibility of the assembly, but this aspect has an additional function. The recesses of the conduit trap an amount of air that, although small, aids the burning process by providing oxygen.

Although the benefits of a reduction in the cost of abandoning a well only occur many years after its construction, the addition of materials and components when implementing the proposed disclosure should not cause a substantial increase in cost and, therefore, should present a return that justifies its adoption.

Such a statement is based on the simplicity of the incorporated materials and their relatively low complexity of implementation, which should not give the flammable cable and control line encapsulator a final cost not very different from conventional ones. Remember that the cable and control line encapsulator does not need to be installed along the entire length of the well.

The skilled in the art will value the knowledge presented herein and can reproduce the disclosure in the presented embodiments and their variants, which are covered in the scope of the claims below.

The invention claimed is:

1. A cable and control line encapsulator, that is flammable or thermally destructible, the encapsulator comprising at least two control lines, a matrix, electric cable core, electrical cable coating A, electric cable coating B, a corrugated conduit, a pyrotechnic material, and a casing.

2. The encapsulator, according to claim 1, wherein the encapsulator is ignited and combusts between 60° and 800° C.

3. The encapsulator, according to claim 2, wherein the encapsulator accommodates cables and lines.

4. The encapsulator, according to claim 2, wherein the control lines are manufactured of steel.

5. The encapsulator, according to claim 4, wherein the matrix is manufactured with santoprene or polypropylene.

6. The encapsulator, according to claim 5, wherein the matrix is internally aerated and comprises a smooth external finish.

7. The encapsulator, according to claim 1, the encapsulator is used between 150 and 200 m above the production packer, in front of the capping rock.

8. The encapsulator, according to claim 7, wherein the electrical cable core is manufactured of conductive material.

9. The encapsulator, according to claim 8, wherein the electrical cable coating A is manufactured from fluorinated ethylene propylene (FEP).

10. The encapsulator, according to claim 9, wherein the electrical cable coating B is manufactured from fluorinated ethylene propylene (FEP).

11. The encapsulator, according to claim 9, wherein the electrical cable coating B is manufactured from fluorinated ethylene propylene (FEP), and wherein the corrugated conduit is manufactured from high-density polyethylene (HDPE).

12. The encapsulator, according to claim 8, wherein the corrugated conduit is manufactured from high-density polyethylene (HDPE).

13. The encapsulator, according to claim 8, wherein the pyrotechnic material is thermite based on manganese and aluminum oxide.

14. The encapsulator, according to claim 8, wherein the casing comprises polyvinyl chloride (PVC).

15. The encapsulator, according to claim 14, wherein the corrugated conduits are profiled in sections of two or three feet each.

16. The encapsulator, according to claim 14, wherein the corrugate that is flammable or thermally destructible, and wherein the encapsulator conduits are profiled in sections of two or three feet each.

17. The encapsulator, according to claim 8, wherein the electrical cable coating A is manufactured from fluorinated ethylene propylene (FEP).

18. The encapsulator, according to claim 8, wherein the pyrotechnic material is thermite based on manganese and aluminum oxide, and wherein the casing is manufactured from polyvinyl chloride (PVC).

19. A cable and control line encapsulator that is flammable or thermally destructible, the encapsulator comprising two or more control lines manufactured of stee, a matrix, an electric cable core manufactured of a c, electrical cable coating A, electric cable coating B, a corrugated conduit, a pyrotechnic material, and a casing, the encapsulator ignitable and combustible between 60° and 800° C.

20. The encapsulator, according to claim 19, wherein the matrix is manufactured with santoprene or polypropylene, and wherein the matrix is internally aerated and comprises a smooth external finish.

21. The encapsulator, according to claim 20, wherein the electrical cable core is manufactured of conductive material.

* * * * *